H. S. NEATS.
CLAMP OR SECURING DEVICE FOR WIRE CABLES AND THE LIKE.
APPLICATION FILED JULY 31, 1911.
1,010,301.
Patented Nov. 28, 1911.
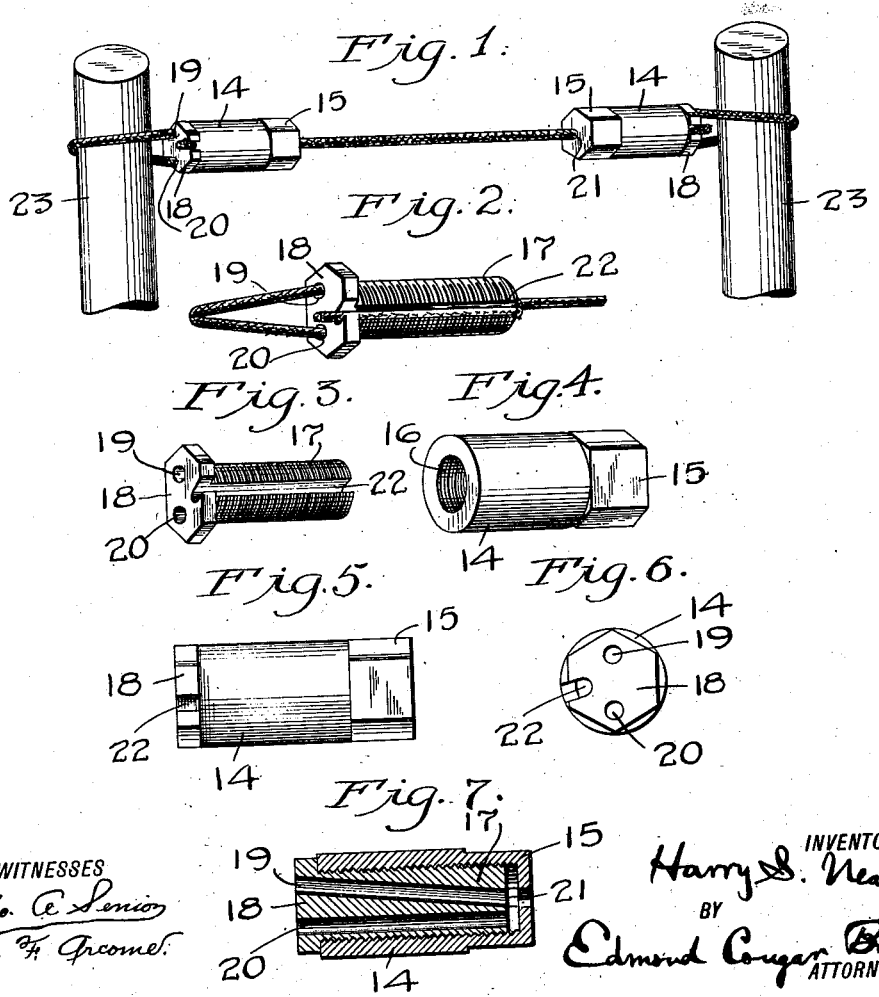

UNITED STATES PATENT OFFICE.

HARRY S. NEATS, OF EAST ORANGE, NEW JERSEY.

CLAMP OR SECURING DEVICE FOR WIRE CABLES AND THE LIKE.

1,010,301.  Specification of Letters Patent.  Patented Nov. 28, 1911.

Application filed July 31, 1911. Serial No. 641,525.

*To all whom it may concern:*

Be it known that I, HARRY S. NEATS, a citizen of the United States, and a resident of the city of East Orange, in the county of Essex and State of New Jersey, have invented certain new and useful Improvements in Clamps or Securing Devices for Wire Cables and the Like, of which the following is a specification.

My invention relates to means for securing the ends of wires or wire cables and the like, such as are used in aeroplane construction, for example, and many other similar purposes.

The invention consists in the novel construction, arrangement and combination of various elements and parts, whereby a simple and efficient clamp or securing means is produced, as hereinafter more particularly set forth.

In the accompanying drawings Figure 1 is a general view of one form of my invention showing two clamps holding the two ends of a wire or cable which is shown as connecting two rods or posts. Fig. 2 represents on a larger scale a perspective view of the inner plug member of the clamp in connection with a wire or cable. Fig. 3 is a perspective view also on a larger scale of the inner or plug member of this clamp. Fig. 4 is a perspective view also on a larger scale of the outer sleeve or socket member of said clamp. Fig. 5 represents a side elevation of this clamp including the socket and plug members united. Fig. 6 is an end elevation of the plug. Fig. 7 represents a longitudinal vertical section thereof.

Similar reference numbers indicate corresponding parts in all the figures.

A clamp embodying this invention in the form shown in the drawings comprises a cylindrical sleeve or socket member 14 and a plug member 17.

The end 15 of the socket member 14 is angular in form preferably hexagonal to permit the application of a wrench. This socket member 14 is hollowed out for the greater part of its length preferably in the form of a screw-threaded bore 16. The hexagonal end is closed and provided with an approximately central aperture or perforation 21, shown in Fig. 7, opening into the hollow interior space 16.

The plug member 17 is preferably provided with an enlarged head 18 which may be made angular, preferably hexagonal in shape to adapt it to receive a wrench or similar device. The main body of the plug member is externally screw-threaded as shown in Figs. 2 and 3 so that it may be screwed into the member 17. This plug member is provided with two longitudinal wireways or bores 19 and 20, whereof the bore 19 runs in a slanting direction adapting it to register with the opening 21 in the member 14 when the parts are assembled as shown in Fig. 7, but the other bore 20 runs approximately parallel with the side of the plug member 17. The plug member 17 is also provided with a longitudinal wireway in the form of a groove or channel 22.

In using the form of my invention just described the end of the wire or cable to be secured is passed first through the opening 21 in the end of the member 14 and continued through the bore 19 or the plug 17, then, for example, around a post 23 or other object which is to be secured by the said wire or cable, as shown in Fig. 1, then back through the bore 20, then across the inner end of the plug member 17, between the same and the end of the member 14, then back through the channel 22 of the plug member 17. It will of course be understood that the above operations are performed while the members 14 and 17 are separate from each other, but that after the wire or cable has been placed in position in the bores and channel as above described, the member 14 is brought up to the member 17 and screwed over the latter until the two members are brought into the position shown in Fig. 7. When this has been done the two members are securely attached together and the end of the wire or cable is held firmly in place against any tractive force to which the same may be subjected.

Having thus described my invention, what I claim as new and desire to secure by Letters Patent is as follows:

1. A device of the character described comprising a socket member having a closed end provided with a small central opening and a plug member having a triangular series of longitudinal wireways, one of which registers at one end with said central opening.

2. A device of the character described comprising a plug member provided with a plurality of longitudinal passages or bores and a longitudinal groove or channel; an exterior member hollowed out from one end for a substantial portion of its length and provided at the other end with an approximately central opening and adapted to receive interiorly thereof the said plug member.

In witness whereof I have hereunto signed my name this 28th day of July, 1911, in the presence of two subscribing witnesses.

HARRY S. NEATS.

Witnesses:
　EDMOND CONGAR BROWN,
　E. L. BROWN.